June 13, 1972 S. L. STOKES 3,669,507
CONTROL VALVE
Filed April 28, 1970

INVENTOR
STANLEY L. STOKES
BY
Joseph E. Papin

United States Patent Office 3,669,507
Patented June 13, 1972

3,669,507
CONTROL VALVE
Stanley L. Stokes, Florissant, Mo., assignor to Wagner Electric Corporation, Newark, N.J.
Filed Apr. 28, 1970, Ser. No. 32,612
Int. Cl. B60t 8/26, 11/34
U.S. Cl. 303—6 C    22 Claims

ABSTRACT OF THE DISCLOSURE

A control valve for use in a hydraulic brake system is provided with a spring loaded piston which carries a proportioning member. The proportioning member is actuated in response to supplied fluid pressure in excess of a predetermined value to effect the application of a proportionally reduced fluid pressure through the control valve, and the piston is movable against its spring in response to another predetermined value in excess of the first named predetermined value acting thereon to increase the applied fluid pressure. The actuation of the proportioning member is thereafter resumed in response to a third predetermined value predeterminately in excess of the other predetermined value of the supplied fluid pressure acting thereon to further effect proportionally reduced increases in the applied fluid pressure.

---

This invention relates in general to hydraulic brake systems and in particular to a control valve for proportioning the pressure of said system under preselected conditions.

SUMMARY

In the past, various types of control valves have been utilized in a hydraulic brake system to proportion the fluid pressure supplied from the fluid pressure source to energize the vehicle rear brakes in order to allow the actual front brake to rear brake torque distribution to approach the theoritical or ideal torque distributions therebetween. The past control valves provided either a single-step, knee point proportioning curve or a two-step, double knee point proportioning curve in an effort to approach the ideal front to rear brake torque distribution curve for various vehicles; however, one of the disadvantageous or undesirable features of such past control valves was that their structural features could not effect a proportioning curve which closely approximated the desired front to rear brake torque distribution curve.

The principle object of the present invention is to provide a control valve which overcomes the aforementioned disadvantageous or undesirable features of the past control valves, and this as well as other objects and advantageous features of the present invention, will become apparent hereinafter.

Briefly, the present invention embodies a control valve, a proportioning member movable in another member in response to supplied fluid pressures in excess of a predetermined value to effect the application of a proportionally reduced fluid pressure therethrough, said other member being movable in response to another predetermined value in excess of the first named predetermined value of the applied fluid pressure to effect an unproportioned increase in the applied fluid pressure, and said proportioning member being thereafter actuated in response to a third predetermined value predeterminately in excess of the other predetermined value to further effect proportional increases in the applied fluid pressure.

DESCRIPTION OF THE DRAWINGS

In the drawings which form a part of the specification and art, like numerals refer to like parts wherever they occur.

Figure 1:
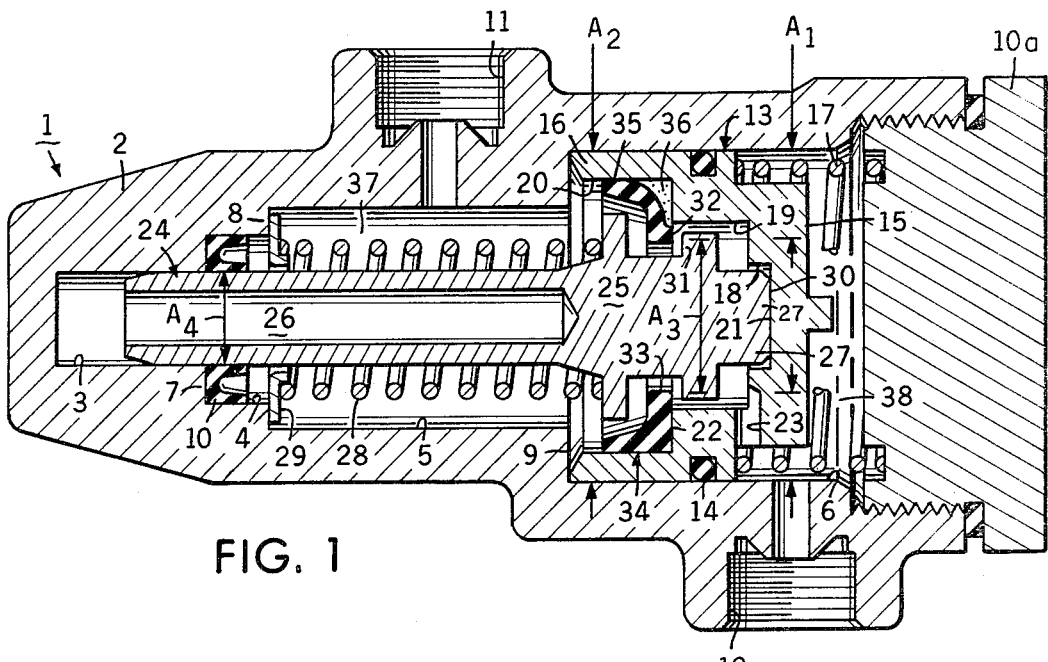
FIG. 1 is a sectional view illustrating a control valve embodying the present invention in cross-section.

Referring now to the drawings in detail and in particular to FIG. 1, a control valve 1 is provided with a housing 2 having a bore 3 therein aligned with stepped counterbores 4, 5 and 6. A shoulder 7 is provided on the housing 2 between the bore 3 and counterbore 4; and shoulders 8, 9 are also provided on said housing between counterbores 4, 5 and 5, 6, respectively. An annular seal 10 is provided in sealing engagement with the housing counterbore 4 and seated against the housing shoulder 7 about the housing bore 3, and a closure member or end plug 10a is threadedly received in the open end of the counterbore 6. Inlet port 11, which is adapted for connection with a fluid pressure source, such as a master cylinder (not shown), is provided in the housing 2 intersecting with the counterbore 5, and an outlet port 12, which is adapted for connection with the vehicle rear brakes (not shown), is also provided in said housing intersecting with the counterbore 6 adjacent to the interior end of the closure member 10a.

A displacement or translatory fluid pressure intensifying member, such as the piston indicated generally at 13, is slidably received in the housing counterbore 6 having a peripheral seal 14 in sealing engagement with said housing counterbore between the housing shoulder 9 and the outlet port 12. The piston 13 is provided with opposed ends 15, 16, and a spring 17 is pre-compressed between the interior end of the closure member 10a and the piston rightward end 15 normally urging the piston 13 toward an inoperative position engaging the piston leftward end 16 with the housing shoulder 9. Aligned stepped bores 18, 19 and 20 are provided in the piston 13 intersecting with the piston end 16, and the end wall 21 of the smaller stepped bore 18 defines an abutment on said piston. A shoulder 22 is defined on the piston 13 between the intermediate and larger stepped bores 19, 20 and a radially extending connecting passage 23 is provided in said piston between the intermediate stepped bore 19 and the peripheral portion of said piston to connect said intermediate stepped bore in open pressure fluid communication with the outlet port 12 at all times.

A modulating or proportioning member, such as the piston indicated generally at 24, is provided with a head portion 25 integrally formed between opposed reduced extensions or stem portions 26, 27. The extension 26 extends through the housing seal 10 in sealing engagement therewith into sliding and guiding engagement with the housing bore 3, and the extension 27 is slidably and guidably received in the smaller stepped bore 18 of the piston 13. A metering or proportioning spring 28 is biased between the proportioning piston head 25 and a retainer 29 normally urging said retainer into abutting engagement with the housing shoulder 8 and urging the proportioning piston 24 toward its normal or inoperative position engaging the free end 30 of the proportioning piston extension 27 into abutting engagement with the end wall 21 of the piston stepped bore 18.

The proportioning piston 24 is provided with an annular valve member 31 on the head portion 25 thereof which, in the inoperative position of said proportioning piston, is spaced from a cooperating valve seat 32 provided about an aperture 33 extending axially through a seating member, indicated generally at 34. The seating member 34 is normally positioned in seating engagement with the piston shoulder 22, and the seating member aperture 33 is radially spaced from the peripheral of the proportioning piston 24. A peripheral lip portion 35 is integrally provided on the seating member 34 normally in sealing engagement with the larger stepped bore 20 of the piston 13 to close return flow passages 36 provided across said seating member.

An inlet chamber 37 is defined in the housing counterbore 4, 5 and 6 between the seal 10 and the seating member 34, and an outlet chamber 38 is defined in the intermediate stepped bore 19 of the piston 13 and the housing counterbore 6 between the piston seal 14 and the closure member 10a in open pressure fluid communication with the outlet port 12 at all times.

It should be noted that opposed effective and substantially equal annular areas $A_1$, $A_2$ are provided on the opposed ends 15, 16 of the piston 13, said areas $A_1$, $A_2$ being generally defined between the sealing engagement of the piston seal 14 with the housing counterbore 6 and the sealing engagement of the proportioning piston valve member 31 with the seating member valve seat 32. To conclude the description of the control valve 1, the proportioning piston 24 is provided with an area $A_3$ defined by the sealing engagement of the valve member 31 thereof with the seating member valve seat 32 which is subjected to the fluid pressure at the outlet port 12, and the sealing engagement of the proportioning piston extension 26 with the housing seal 10 defines another area $A_4$ which is less than and opposed to the area $A_3$, said area $A_4$ being subjected to the atmosphere in the housing bore 3 at all times.

In the operation with the component parts of the control valve 1 positioned as shown in the drawings and as described hereinabove, a supplied or input fluid pressure $P_i$ is transmitted upon actuation of the master cylinder (not shown) from the inlet port 11 through the inlet and outlet chambers 37, 38 to establish an applied or output fluid pressure $P_o$ at the outlet port 12 for energizing the vehicle rear brakes (not shown), said input and output fluid pressures $P_i$, $P_o$ initially having substantially the same magnitudes. The input fluid pressure $P_i$ acts on the effective area $A_3$ of the proportioning piston 24 to establish a closing force $P_i A_3$ tending to urge said proportioning piston against the compressive force $F_c$ of the metering spring 28; however, the metering spring force $F_c$ opposes movement of said porportioning piston until the input fluid pressure $P_i$ attalins a predetermined value L, as shown on the line OR in the graph of FIG. 2. When the predetermined value L of the input fluid pressure $P_i$ is attained, the closing force $P_i A_3$ overcomes the compressive force $F_c$ of the metering spring 28 to move the proportioning piston 24 leftwardly from its normal or inoperative position toward an isolating position, such movement being relative to the piston 13. The movement of the proportioning piston 24 to its isolating position engages the valve member 31 thereof with the seating member valve seat 32 closing the seating member aperture 33 to isolate the input fluid pressure $P_i$ in the inlet chamber 37 from the output fluid pressure $P_o$ in the outlet chamber at 38, and upon the engagement of said valve member with said valve seat, the input fluid pressure $P_i$ acts on the effective input area $A_4 - A_3$ of the proportioning piston 24 to establish an input force which is additive to the spring force $F_c$ to substantially balance the opposed output force $P_o A_4$ established by the output fluid pressure P acting on the effective output area $A_4$ of said proportioning piston.

Figure 2:
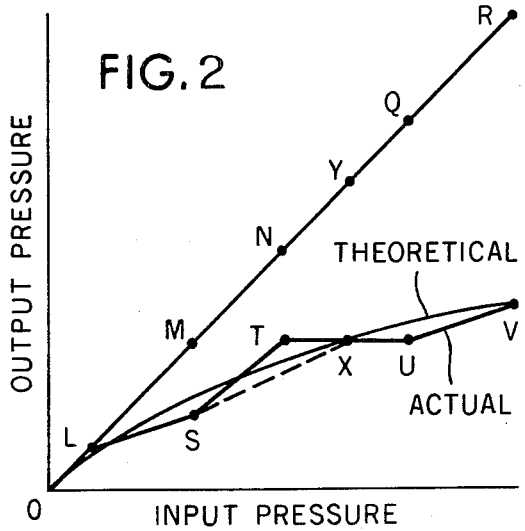
FIG. 2 is a graphical representation illustrating a theoritical curve of the front to rear brake torque distribution as compared with the actual applied or output fluid pressure effected by the control valve of FIG. 1 in response to the supplied or input fluid pressure.

From the graphical representation in FIG. 2, it is obvious that an increase in the magnitude of the input fluid pressure $P_i$ in excess of the predetermined value L will result in proportionally reduced increases in the output fluid pressure $P_o$, as shown by the line LS. For instance, when the input fluid pressure $P_i$ is increased to a value in excess of the predetermined value L, but less than the predetermined value M on the line OR, the input force $P_i(A_4 - A_3)$ is correspondingly increased and additive to the metering spring force $F_c$ to overcome the output force $P_o A_4$; therefore, the metering piston 24 is moved in a rightward direction toward a metering position disengaging the valve member 31 thereof from the seating member valve seat 32 to effect a metered application of the input fluid pressure $P_i$ through the seating member aperture 33 and the outlet chamber 38 to the outlet port 12 to effect proportional increases of the output fluid pressure $P_o$ in a predetermined ratio with the input fluid pressure $P_i$ at the inlet port 11, as shown by line LS in the graph of FIG. 2, wherein $$P_o = \frac{Pi(A_4 - A_3) + Fc}{A_4}$$

Of course, the increased output fluid pressure $P_o$ effects a corresponding increase in the output force $P_o A_4$, and when the increased output force $P_o A_4$ attains an increased value substantially equal to that of the increased input force $P_i(A_4 - A_3)$ and the additive metering spring force $F_c$, the proportioning piston 24 is moved toward its isolating position to re-engage the valve member 31 thereof with the seating member valve seat 32 to again isolate the increased input fluid pressure $P_i$ and the proportionally increased output fluid pressure $P_o$. It is, of course, obvious that the proportioning piston 24 will be responsive to further increases in the input fluid pressure $P_i$ to effect further corresponding proportional increases in the output fluid pressure $P_o$, in the same manner as previously described.

The input and output fluid pressures $P_i$, $P_o$ in the inlet and outlet chambers 37, 38 act on the opposed effective areas $A_2$, $A_1$ of the piston 13 to establish opposed rightward and leftward translatory forces $P_i A_2$, $P_o A_1$, respectively, and due to the predetermined ratio between the magnitudes of the input and output fluid pressures $P_i$, $P_o$, the rightward or input translatory force $P_i A_2$ is predeterminately proportionally greater than the leftward or output translatory force $P_o A_1$; however, the precompressive force $F_s$ of the spring 17 prevents translatory movement of the piston 13 from its normal operating position until the input and output fluid pressures $P_i$, $P_o$ exceed their respective predetermined values M, S; as shown along the lines MN and ST in the graph of FIG. 2. When the input and output fluid pressures $P_i$, $P_o$ exceed their respective proportional predetermined values M, S, the rightward translatory force $P_i A_2$ overcomes the opposing leftward translatory and spring forces $P_o A_1$, $F_s$ and displaces the piston 13 rightwardly in the housing counterbore 6 to a translated position engaging the piston rightward end 16 with the interior end of the closure member 10a. This rightward displacement or movement of the piston 13 effects an increase in the output fluid pressure $P_o$ at the outlet port 12, as shown by the line ST in the graph of FIG. 2, which is in a predetermined ratio with the increased input fluid pressure at the inlet port 11 wherein $$P_o = \frac{Pi A_2 - F_s}{A_1}$$

Of course, the increased input force $P_i(A_4 - A_3)$ acting on the proportioning piston 24 effects concerted movement thereof with the piston 13 to its translated position; however, since the output fluid pressure $P_o$ was increased by the translatory movement of the piston 13 in another ratio different than that effected by the general modulating or proportioning actuation of the proportioning piston 24, it is now necessary to effect a further increase in the input fluid pressure to values in excess of the predetermined value Q, as shown on the line OR in the graph of FIG. 2, before the input and output fluid pressures $P_i$, $P_o$ regain the predetermined ratio therebetween necessary for the proportional actuation of said proportioning piston.

In other words, the increase of the input fluid pressure $P_i$ between the predetermined values N and Q does not effect an increase in the output fluid pressure $P_o$, as shown by the line TU in the graph of FIG. 2; however, at the predetermined value Q, the predetermined ratio between the magnitudes of the input and output fluid pressures $P_i$, $P_o$ is reestablished for effecting further proportioning actuation of the proportioning piston 24. It is, therefore, apparent that further increases in the input fluid pressure $P_i$ in excess of the predetermined value Q will effect corresponding increases in the input force $P_i(A_4-A_3)$ to actuate the proportioning piston 24 against the opposing output and spring forces $P_oA_4$, $F_c$ and effect proportional increases in the output fluid pressure $P_o$, as shown by the line UV in the graph of FIG. 2 and as discussed hereinbefore.

Upon the elimination of the input fluid pressure $P_i$ when the master cylinder is de-actuated, the input and translatory forces $P_i(A_4-A_3)$, $P_iA_2$, respectively acting on the proportioning piston 24 and the piston 13 are also eliminated, and the output fluid pressure $P_o$ acting on the seating member 34 displaces the sealing lip 35 thereof from sealing engagement with the larger stepped bore 20 of the piston 13 to open the return flow passages 36 across said seating member. In this manner, the output fluid pressure $P_o$ returns from the outlet port and chamber 12, 38 through the open return flow passages 36 into the inlet chamber 37 to the inlet port 11. Of course, the output and translatory forces $P_oA_4$, $P_oA_1$ acting respectively on the proportioning piston 24 and the piston 13 and assisted by the compressive force $F_s$ of the spring 17 effect the leftward concerted movement of the proportioning piston 24 of the piston 13 to re-engage the leftward end 15 of the piston 13 with the housing shoulder 9 upon the elimination of the opposing input and translatory forces $P_i(A_4-A_3)$, $P_iA_2$. Thereafter, when the output fluid pressure is so reduced to correspondingly reduce the output forve $P_oA_4$ acting on the proportioning piston 24 to a valve less than the metering spring force $F_c$, the metering spring 28 moves the proportioning piston 24 rightwardly to its original or inoperative position and relative to the piston 13 in its normal operating position. In this manner, the free end of the extension 27 is re-engaged with the end wall 21 of the smaller stepped bore 18 in the piston 13, and the valve member 31 is disengaged from the seating member valve seat 32 to again open the seating member aperture 33 re-establishing open pressure fluid communication therethrough between the inlet and outlet ports 11, 12 to effect the complete elimination of the output fluid pressure $P_o$.

Figure 3:
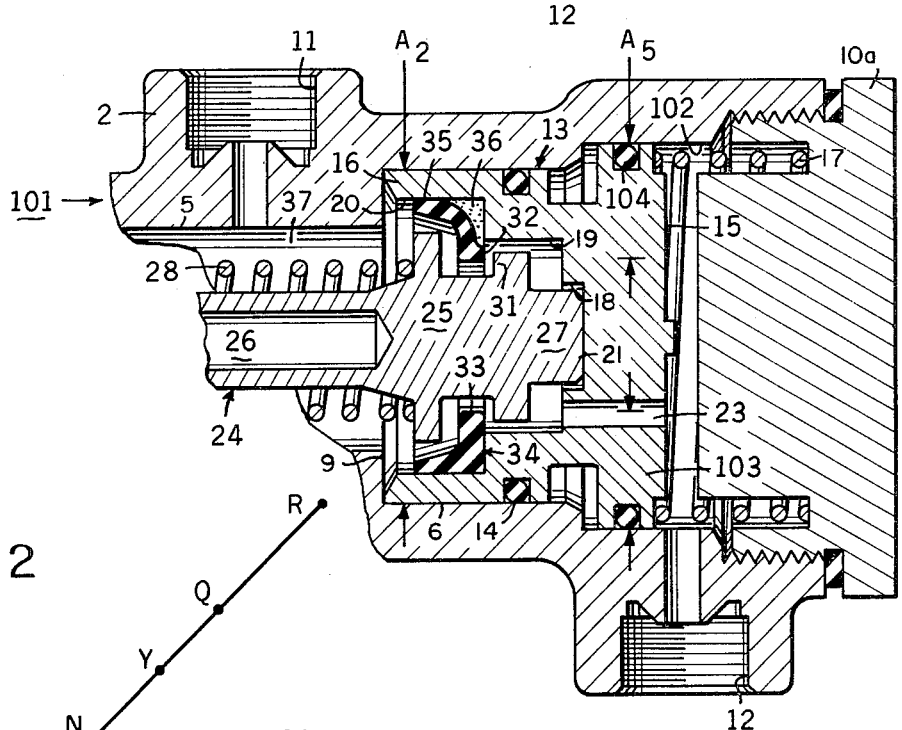
FIG. 3 is a fragmentary view taken from FIG. 1 and illustrating another embodiment of the present invention in cross-section.

Referring now to FIG. 3, another control valve 101 is shown having substantially the same component parts and functioning substantially in the same manner as the previously described control valve 1 with the following exceptions.

The control valve 101 is provided with a counterbore 102 coaxially aligned with the counterbore 6 in the housing 2, and the closure member 10a is threadedly received in the open end of the counterbore 102. The translatory piston 13 is provided with an integral stepped extension or flange 103 which is slidably received in the housing counterbore 102 and forms the rightward end 15 of the piston 13. A peripheral seal 104 is carried in the piston flange 103 in sealing engagement with the housing counterbore 102, and another annular effective area $A_5$ is defined on said piston flange between the sealing engagement of the seal 104 with the housing counterbore 102 and the sealing engagement of the proportioning piston valve member 31 with the seating member valve seat 32. The area $A_5$ is subjected to the output fluid pressure $P_o$ at the outlet port 12 at all times and is opposed to and predeterminately greater than the area $A_2$. The effect of the differential areas $A_2$, $A_5$ on the operation of the control valve 1 is reflected along the dotted line SX in the graph of FIG. 2. In other words, the input and output fluid pressures $P_i$, $P_o$ in the inlet and outlet chambers 37, 38 act on the opposed effective areas $A_2$, $A_5$ to establish opposed rightward and leftward translatory forces $P_iA_2$, $P_oA_5$, and as previously discussed the compressive force $F_s$ of the spring 17 prevents the translatory movement of the piston 13 until the input and output fluid pressures exceed their respective predetermined values MS, as shown along the lines MY and SX in the graph of FIG. 2. When the input and output fluid pressures $P_i$, $P_o$ exceed their respective predetermined values M, S, the rightward translatory force $P_iA_2$ overcomes the opposing leftward translatory and spring forces $P_oA_5$, $F_s$ to effect the movement of the piston 13 to its translated position. This rightward displacement or translatory movement of the piston 13 effects an increase in the output fluid pressure $P_o$ at the outlet port 12, as shown by the dotted line SX in the graph of FIG. 2, which is in a predetermined ratio with the increased input fluid pressure at the inlet port 11 wherein $$P_o = \frac{P_iA_2 - F_s}{A_5}$$

From the foregoing, it is now apparent that novel control valves 1, 101 are disclosed and that changes or modifications as to the precise configurations, shapes, and details of the constructions set forth in the specifications by way of illustration may be made by those skilled in the art without departing from the spirit of the invention.

The embodiments of the invention in which an exclusive property or privilege is claimed are defined as follows:

1. A control valve comprising a housing, means movable in said housing between opposed operating portions and defining with said housing a pressure fluid flow passage therethrough, and modulating means concertedly movable with said first named means between its opposed positions and movable relative to said first named means in each of its opposed positions for controlling the application through said flow passage of fluid pressure supplied thereto, said modulating means being movable relative to said first named means in one of its opposed positions and operable generally in response to supplied fluid pressure in excess of a predetermined value to perform a fluid modulating operation thereon and effect a reduced applied fluid pressure through said flow passage, said first named and modulating means being concertedly movable in response to supplied fluid pressure of another predetermined value predeterminately greater than the first named predetermined value toward the other of its opposed positions in said housing to increase the applied fluid pressure, and said modulating means being thereafter generally operable in the other position of said first named means in response to supplied fluid pressure in excess of a third predetermined value predeterminately greater than the other predetermined value to further perform its fluid modulating operation thereon.

2. A control valve comprising a housing, resiliently urged means movable in said housing between first and second positions, proportioning means movable concertedly with and relative to said resiliently urged means and defining therewith a pressure fluid flow passage through said housing, said proportioning means being respectively movable relative to said resiliently urged means in its first and second positions in response to fluid pressure supplied to said flow passage in excess of first and second predetermined values to effect a reduced application thereof through said flow passage, and said proportioning means being concertedly movable with said resiliently urged means against its own force from its first position toward its second position in response to supplied fluid pressure of another predetermined value acting thereon intermediate in magnitude to that of the first and second predetermined values and predeterminately greater than the applied fluid pressure acting thereon to effect an increase in the applied fluid pressure.

3. A control valve comprising a housing, resiliently urged means movable in said housing between two positions and defining with said housing a pressure fluid flow passage for the application therethrough of supplied fluid pressure, proportioning means movable relative to said resiliently urged means in each of its two positions for controlling said flow passage and concertedly movable with said resiliently urged means from one of its positions to the other thereof, said proportioning means being movable relative to said resiliently urged means in its one position in response to supplied fluid pressure in excess of a predetermined value to effect the application of a proportionally reduced fluid pressure through said flow passage, said resiliently urged means being movable against its own force and said proportioning means being concertedly movable therewith to the other position in response to supplied fluid pressure in excess of another predetermined value predeterminately greater than the first named predetermined value acting thereon to effect an increase in the reduced applied fluid pressure, and said proportioning means being thereafter actuated relative to said resiliently urged means in its other position in response to supplied fluid pressures in excess of a third predetermined value predeterminately greater than the other predetermined value to effect further proportional increases in the reduced applied fluid pressure.

4. A control valve according to claim 3, comprising opposed areas on said resiliently urged means for respective subjection to the supplied and reduced applied fluid pressures, said resiliently urged means being movable toward its other position in response to the supplied fluid pressure of the other predetermined value acting on one of said opposed areas against the reduced applied fluid pressure acting on the other of said areas and the force of said resiliently urged means.

5. A control valve according to claim 4, wherein said other opposed area is predeterminately greater than said one opposed area.

6. A control valve according to claim 3, wherein said resiliently urged means includes piston means slidable in said housing between the one and other positions, spring means engaged between said piston means and housing and opposing the movement of said piston means to the other position thereof, and passage means in said piston means defining a portion of said flow passage.

7. A control valve according to claim 3, wherein said proportioning means includes piston means slidable in said resiliently urged means and movable relative thereto in the one and other positions of said resiliently urged means and concertedly movable with said resiliently urged means toward its other position, and spring means engaged between said piston means and said housing urging said piston means toward said resiliently urged means, said piston means being movable against said spring means and relative to said resiliently urged means in response to the first named and third predetermined values of the supplied fluid pressures acting thereon to effect the proportional increases in the reduced applied fluid pressures when said resiliently urged means is in its one and other positions, respectively, and said spring means assisting the concerted movement of said piston means with said resiliently urged means from the one position to the other position thereof.

8. A control valve according to claim 7, comprising a valve seat in said resiliently urged means about said flow passage, and valve means on said proportioning piston for engagement with said valve seat, said piston means being initially movable relative to said resiliently urged means in the one position thereof and against said spring means in response to the supplied fluid pressure of the first named predetermined value acting thereon toward an isolating position engaging said valve means with said valve seat and isolating the supplied and applied fluid pressures and being thereafter further movable in response to the supplied fluid pressure in excess of the first named predetermined value acting thereon and assisted by said spring means toward a metering position disengaging said valve means from said valve seat to effect the increases in the reduced applied fluid pressure in a predetermined ratio with the supplied fluid pressure in excess of the first named predetermined value, and said proportioning piston also being movable relative to said resiliently urged means in the other position thereof from the isolating to the metering positions of said piston means in response to the supplied fluid pressure in excess of the third predetermined value acting thereon and assisted by said spring means to further effect the increases in the reduced applied fluid pressure in the predetermined ratio with the supplied fluid pressure in excess of the third predetermined value.

9. A control valve according to claim 8, wherein said resiliently urged means includes other piston means slidable in said housing between the one and other positions thereof, passage means in said other piston means defining a portion of said flow passage, said valve seat being on said other piston means about said passage means, said first named piston means being slidable in said passage means, and other spring means engaged between said other piston means and said housing urging said other piston means toward said first piston means.

10. A control valve according to claim 9, comprising a pair of spaced abutment means in said housing for respective engagement with said other piston means, said other spring means urging said other piston means into engagement with one of said abutment means when said other piston means is in its one position, and said other piston means being movable against said other spring means into engagement with the other of said abutment means when said other piston means is in its other position.

11. A control valve according to claim 7, wherein said resiliently urged means includes other piston means slidable in said housing between the one and other positions thereof, passage means in said other piston means defining a portion of said flow passage, said first named piston means being slidable in said passage means, and other spring means engaged between said other piston means and said housing urging said other piston means toward its one position and toward said first named piston means, said other piston means being movable towards its other position against said other spring means.

12. A control valve comprising a housing having inlet and outlet ports therein, a pair of resiliently urged means relatively and concertedly movable in said housing for controlling pressure fluid communication between said inlet and outlet ports, one of said resilently urged means being initially movable against its own force and relative to the other of said resiliently urged means in response to fluid pressure at said inlet and outlet ports of a predetermined value toward an isolating position interrupting pressure fluid communication between said inlet and outlet port and being thereafter further movable assisted by its own force in response to increases in the fluid pressure at said inlet port in excess of the predetermined value toward a metering position establishing metered pressure fluid communication between said inlet and outlet ports to effect a metered increase in the fluid pressure at said outlet port in a predetermined ratio with the increased fluid pressure at said inlet port, opposed areas on said other resiliently urged means respectively subjected to the fluid pressures at said inlet and outlet ports, said other resiliently urged means being movable against its own force toward a translated position in said housing and said one resiliently urged means being concertedly movable therewith and assisted by its own force in response to another fluid pressure in excess of another predetermined value predeterminately greater than the first named predetermined value of the fluid pressure at said inlet port acting on one of said areas against the fluid pressure at said outlet port acting on the other of said areas and additive to the force of said other resiliently urged means, and said one resiliently urged means being thereafter actuated from its isolating position to its metering position in response to fluid pressure in excess of a third predetermined value predeterminately greater than the other predetermined value of the fluid pressure at said inlet port to effect further metered increases in the fluid pressure at said outlet port when said other resiliently urged means is in its translated position.

13. A control valve comprising a housing, means for controlling the application through said housing of fluid pressure supplied thereto including resiliently urged means movable in said housing between opposed positions, and proportioning means concertedly movable with said resiliently urged means between its opposed positions and movable relative to said resiliently urged means in its opposed positions for performing proportioning operations on the supplied fluid pressure, said proportioning means being respectively movable relative to said resiliently urged means in each of its opposed positions in response to supplied fluid pressure in excess of one and other predetermined values to effect the application through said housing of a proportionally reduced applied fluid pressure, and opposed effective areas on said resiliently urged means respectively subjected to the supplied and applied fluid pressures, said resiliently urged means being movable against its own force from one of its opposed positions to the other of its opposed positions and said proportioning means being concertedly movable therewith when the magnitude of the supplied fluid pressure acting on one of said areas exceeds that of the applied fluid pressure acting on the other of said areas by a predetermined amount.

14. A control valve comprising a housing having inlet and outlet ports therein, resiliently urged means movable in said housing against its own force from a first operating position to a second operating position, proportioning means concertedly movable in said housing with said resiliently urged means between said first and second operating position and also movable relative to said resiliently urged means in each of the first and second operating positions thereof for performing proportioning operations on fluid pressure flowing from said inlet port to said outlet port, said proportioning means being operable generally in response to fluid pressure at said inlet port in excess of first and second predetermined values to effect a proportionally reduced fluid pressure at said outlet port when said resiliently urged means is in its first and second operating positions, respectively, and opposed effective areas on said resiliently urged means respectively subjected to the fluid pressures at said inlet and outlet ports, said resiliently urged means being movable against its own force from its first operating position to its second operating position and said proportioning means being concertedly movable therewith in response to another predetermined fluid pressure at said inlet port acting on one of said areas and having a magnitude intermediate to those of the first and second predetermined values and exceeding that of the fluid pressure at said outlet port acting on the other of said areas by a predetermined amount.

15. A control valve according to claim 14, wherein said other area is predeterminately greater than said one area.

16. A control valve according to claim 14, wherein said one and other areas are substantially equal.

17. A control valve according to claim 14, comprising opposed abutment means on said housing defining the first and second operating positions of said resiliently urged means, and said resiliently urged means including piston means movable in said housing between said abutment means for engagement therewith, said one and other areas being on said piston means, and spring means urging said piston means toward engagement with one of said abutment means, said piston means being movable against said spring means toward engagement with the other of said abutment means when the magnitude of the fluid pressure at said inlet port acting on said one area attains the other predetermined value and exceeds that of the fluid pressure at said outlet port acting on said other area by the predetermined amount.

18. A control valve according to claim 17, comprising passage means in said piston means between said inlet and outlet ports, a valve seat on said piston means about said passage means, said proportioning means including other piston means movable in said housing and said passage means, valve means on said other piston means for engagement with said valve seat, and other spring means opposed to said first named spring means urging said other piston means toward engagement with said first named piston means and urging said valve means toward a position disengaged from said valve seat, said other piston means being movable against said other spring means relative to said first named piston means in its first operating position in response to fluid pressures at said inlet and outlet ports of the first predetermined value toward a position engaging said valve means with said valve seat to close said passage means and isolate the fluid pressures at said inlet and outlet ports and being thereafter further movable in response to increases in the fluid pressure at said inlet port in excess of the first predetermined value and less than said other predetermined value assisted by said other spring means toward a metering position disengaging said valve means from said valve seat to open said passage means and establish the proportionally reduced fluid pressure at said outlet port, said other spring means moving said other piston means in concert with said first named piston means and said valve seat being moved into re-engagement with said valve means to isolate the fluid pressures at said inlet and outlet ports upon the movement of said first named piston means to its second operating position in engagement with said other abutment means, and said other piston means also being further movable relative to said first named piston means in its second operating position in response to the fluid pressure at said inlet port in excess of the second predetermined value and assisted by said other spring means toward its metering position again disengaging said valve means from said valve seat to re-open said passage means and re-establish the reduced proportional fluid pressure at said outlet port.

19. A control valve comprising a housing, piston means and proportioning means concertedly and relatively movable in said housing and defining therewith expansible inlet and outlet fluid pressure chambers, a pair of abutment means on said housing and respectively in said inlet and outlet chambers for engagement with said piston means, resilient means engaged with said piston means and urging said piston means toward engagement with one of said abutment means, said proportioning means being movable relative to said piston means in response to fluid pressure in said inlet chamber in excess of a predetermined value for preforming proportioning operations thereon and establishing a proportionally reduced fluid pressure in said outlet chamber when said piston means is engaged with said one abutment means, a pair of opposed effective areas on said piston means and subjected to the fluid pressures in said inlet and outlet chambers, respectively, said piston means being movable against said spring means toward engagement with the other of said abutment means and said proportioning means being concertedly movable therewith when the magnitude of the fluid pressure in said inlet chamber acting on one of said areas attains another predetermined value in excess of the first named predetermined value and exceeds that of the fluid pressure in said outlet chamber acting on the other of said areas by a predetermined amount, and said proportioning means also being movable relative to said piston means in response to fluid pressure in said inlet chamber in excess of a third predetermined value greater than said other predetermined value for performing proportioning operations thereon and re-establishing the proportionally reduced fluid pressure in said outlet chamber when said piston means is engaged with said other abutment means.

20. A control valve according to claim 19, wherein said other area is predeterminately greater than said one area.

21. A control valve according to claim 19, comprising a connecting passage in said piston means between said inlet and outlet chambers, a valve seat on said piston means about said connecting passage, a portion of said proportioning means being movable in said connecting passage and including valve means for engagement with said valve seat, said proportioning means being movable in response to the fluid pressure of the first named predetermined value acting thereon toward an isolating position engaging said valve means with said valve seat to close said connecting passage isolating said inlet and outlet chambers and being thereafter further movable in response to fluid pressure in said inlet chamber in excess of the first named predetermined value but less than the other predetermined value acting thereon toward a metering position disengaging said valve means from said valve seat to open said connecting passage establishing metered pressure fluid communication therethrough between said inlet and outlet chambers and the proportionally reduced fluid pressure in said outlet chamber when said piston means is engaged with said one abutment means, said valve seat being re-engaged with said valve upon the concerted movement of said piston means and proportioning means toward the engagement of said piston means with said other abutment means, and said proportioning means also being thereafter further movable in response to fluid pressure in said inlet chamber in excess of the third predetermined value acting thereon to its metering position again disengaging said valve means from said valve seat to re-open said connecting passage re-establishing metered pressure fluid communication therethrough between said inlet and outlet chambers and re-establishing the proportionally reduced fluid pressure in said outlet chamber when said piston means is engaged with said other abutment means.

22. A control valve comprising a housing having a bore therein, means in said housing defining with said bore a pair of opposed abutments, an inlet port in said housing intersecting with said bore, an outlet port in said housing spaced from said inlet port and intersecting with said bore between said abutments, a first piston slidable in said bore between said abutments, a first spring engaged with said first piston and urging it toward engagement with one of said abutments, a passage in said first piston between said inlet and outlet ports, a valve seat on said first piston about said passage, a second piston slidable in said housing including a portion slidable in said passage, valve means on said portion for engagement with said valve seat, a second spring engaged with said second piston urging it toward engagement with said first piston and urging said valve means toward a position disengaged from said valve seat, a pair of opposed effective first areas on said second piston for respective subjection to the fluid pressures at said inlet and outlet ports, said second piston being initially movable against said second spring in response to the fluid pressure at said inlet and outlet port of a first predetermined value acting on the difference between said first area pairs toward an isolating position engaging said valve means with said valve seat to close said passage and said second piston being thereafter further movable in response to increases in the fluid pressure at said inlet port in excess of the first predetermined value but less than a second predetermined value acting on one of said first areas and assisted by said second spring toward a metering position disengaging said valve means from said valve seat to open said passage establishing metered pressure fluid communication therethrough between said inlet and outlet ports and establishing a proportionally reduced fluid pressure at said outlet port acting on the other of said first areas when said first piston is engaged with said one abutment, a pair of opposed effective second areas on said first piston for subjection to the fluid pressures at said inlet and outlet ports, respectively, said first piston means being movable against said first spring toward engagement with the other of said abutments to re-engage said valve means with said valve seat closing said passage and said second piston being urged by said second spring in concerted movement with said first piston means when the magnitude of the fluid pressure at said inlet port acting on one of said second areas attains the second predetermined value and exceeds that of the fluid pressure at said outlet port acting on the other of said second areas by a predetermined amount, and said second piston also being thereafter further movable against said second spring in response to the fluid pressure at said inlet port in excess of a third predetermined value greater than the second predetermined value acting on said one first area toward the metering position again disengaging said valve means from said valve seat to re-open said passage re-establishing pressure fluid communication therethrough between said inlet and outlet ports and also re-establishing the proportionally reduced fluid pressure at said outlet port acting on said other first area.

References Cited
UNITED STATES PATENTS

| | | | |
|---|---|---|---|
| 3,232,057 | 2/1966 | Kersting | 303—6 C |
| 3,508,792 | 4/1970 | Bueler | 303—6 C |
| 3,532,390 | 10/1970 | Bueler | 303—6 C |
| 3,354,638 | 11/1967 | Kersting | 303—6 C X |

MILTON BUCHLER, Primary Examiner

J. J. McLAUGHLIN, Assistant Examiner

U.S. Cl. X.R.

60—54.5 E; 137—493.6, 493.7